FIP8102 OR 3,366,883

Jan. 30, 1968 N. J. GRIFFIN ET AL 3,366,883

AUTOMATIC BROAD BAND VSWR POWER CONTROL

Filed Dec. 20, 1965

INVENTORS.
NOEL J. GRIFFIN
GEORGE A. PERRERO
BY
Alden D. Redfield
Charles M. Hogan
ATTORNEYS.

United States Patent Office 3,366,883

Patented Jan. 30, 1968

3,366,883

AUTOMATIC BROAD BAND VSWR POWER CONTROL

Noel J. Griffin and George A. Perrero, Cincinnati, Ohio, assignors to Avco Corporation, Cincinnati, Ohio, a corporation of Delaware Dec. 20, 1965, Ser. No. 514,977
9 Claims. (Cl. 325—144)

ABSTRACT OF THE DISCLOSURE

This device controls the flow of power from a radio frequency source to an antenna system. Interposed between the radio frequency source and the antenna system is a voltage controlled attenuator. A watt meter senses forward power applied to the antenna system and a watt meter senses reflected power appearing due to mismatch. Samples of forward and reflected power are added and the resultant is used to control the attenuator in such a way that the flow of power is regulated as a function of forward power to a given value for matched conditions and reduced as a function of the amount of mismatch indicated by the presence of reflected power.

In some radio frequency transmitter applications it is highly desirable to maintain substantially constant the level of radio frequency power delivered to an antenna, in spite of power supply fluctuations in the transmitting system. The present invention relates to radio frequency transmitters and it provides a novel system which accomplishes this result.

The principal object of the invention is to provide automatic broad band voltage standing-wave ratio (VSWR) power control through novel and improved means. The invention maintains constant such level of power control throughout a wide range of transmitted frequencies.

Another primary object of the invention is to maintain constant and at a safe level the power dissipation in the final amplifier of a transmitting system, of the type including an antenna matching network, during tune-up of that network. The maintenance of a safe level of power in this amplifier may be required for the protection of transistors, for example.

Another object of the invention is to limit maximum output power under mismatch conditions.

Figure 1:
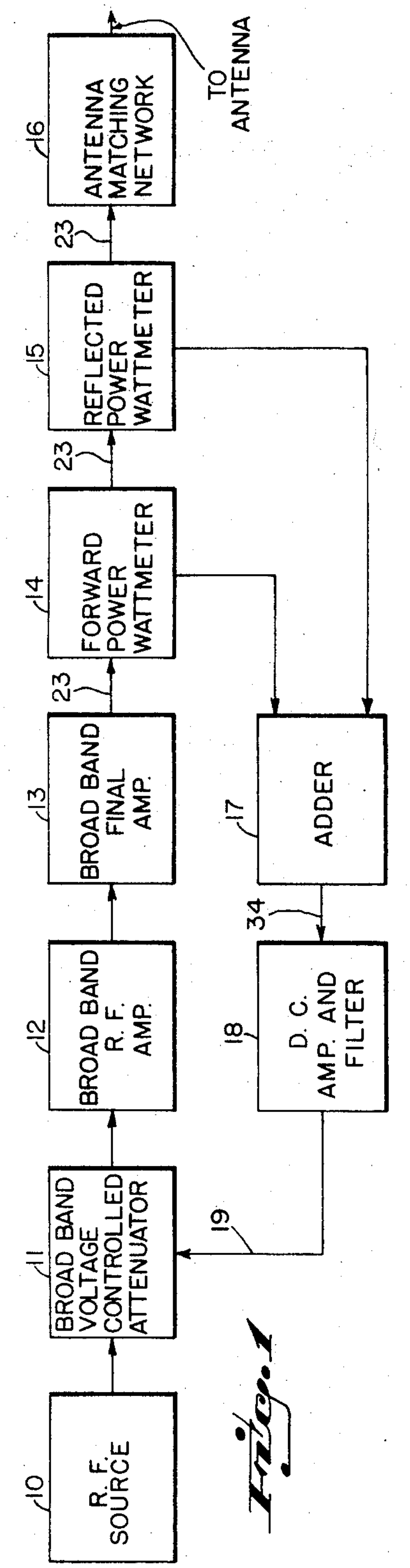
Figure 2:
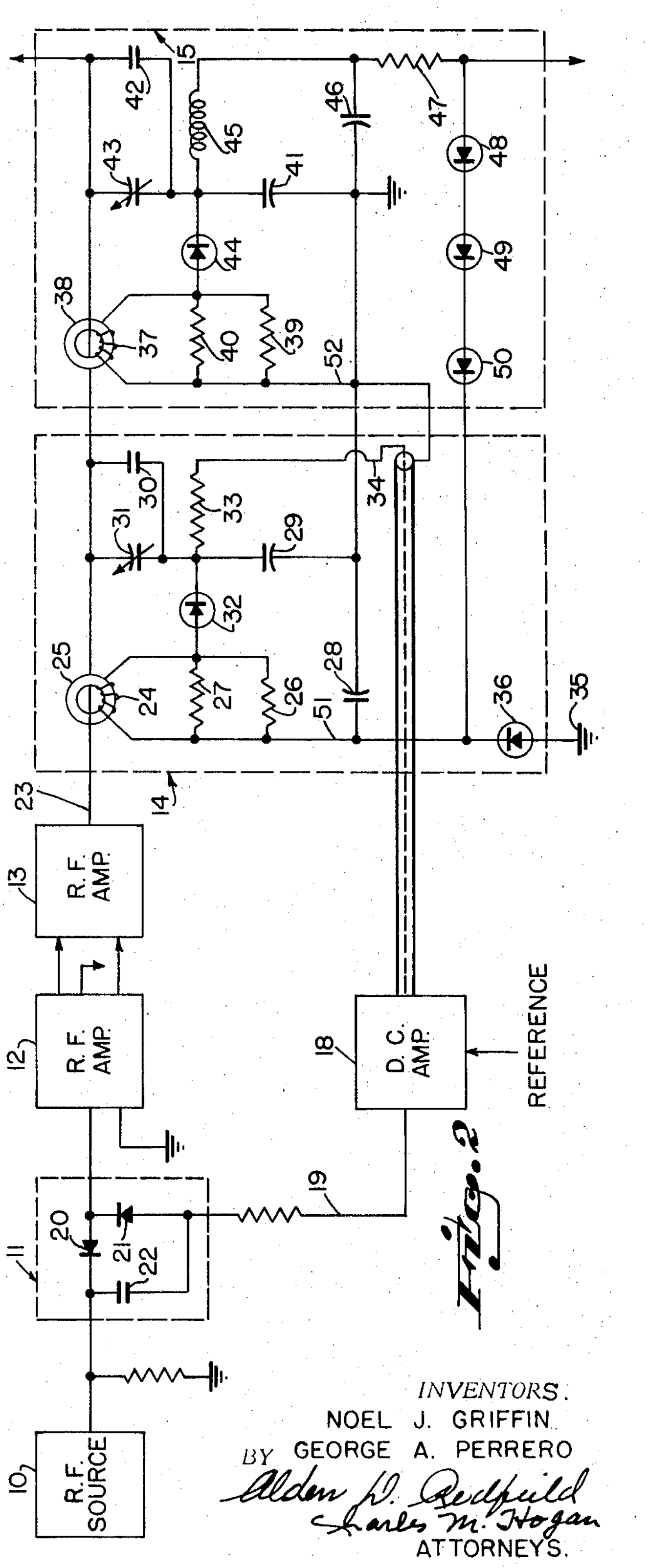

For a better understanding of the invention together with other and further objects, advantages and capabilities thereof, reference is made to the following description of the accompanying drawings in which:

FIG. 1 is a circuit schematic, in block diagram form, of a radio transmitting system including power control means in accordance with the invention; and FIG. 2 is a circuit schematic featuring the attenuator and metering circuits of the invention, they being associated with the radio frequency channel between source and antenna.

The invention herein disclosed provides means for accomplishing the above objectives. Control is achieved by means of a feedback loop. The magnitude of the feedback control signal depends on the sum of two power levels. The first of these levels is the forward R.F. (radio frequency) power being transferred from the power amplifier to the antenna. Under matched conditions (voltage standing-wave ratio) (equal to one) forward power would be the same as available power. The second power level, whose measurement is used in deriving the feedback control signal, is the reverse power being reflected back from the antenna due to conditions of mismatch.

The feedback signal is used to dynamically vary the impedance of an attenuator element placed in the forward loop of the R.F. amplifier chain.

The system shown in FIG. 1 comprises, in cascade, a source of continuous wave radio frequency signals 10, an attenuator network 11, a broad band R.F. driver amplifier stage 12, a broad band R.F. final amplifier stage 13, a forward power wattmeter 14, a reflected power wattmeter 15 and an antenna matching network 16. The output of the antenna matching network 16 goes to an antenna (not shown). Outputs from the wattmeters are applied to an adder network 17 which has an output 34 coupled to a direct current (D.C.) amplifier and filter 18. The feedback circuit is completed by a control signal circuit, i.e., line 19 from unit 18 to attenuator 11.

The R.F. power delivered to the final amplifier 13 is controlled by means of the broad band voltage controlled attenuator 11 in accordance with the feedback signal developed at the adder 17 output. This signal is proportional to the sum of both the forward and reflected wattmeter outputs. Each wattmeter derives an output signal which is proportional to the power being transmitted in the line 23, coupling the final amplifier 13 to the antenna matching network 16. Under a perfectly matched condition (unity VSWR on the line), the reflected wattmeter will have zero output and the forward wattmeter will provide a signal which when compared to the reference in the D.C. (direct current) amplifier 18 will control the power level at the matching network input. Should the matching network be detuned such that a VSWR greater than unity exists on the line, the reflected wattmeter will develop an output proportional to this VSWR. The feedback control signal level will increase, raising the impedance of the attenuator 11, and thus reduce the drive to the final amplifier 13. In this manner the antenna can go from an open circuit to a short circuit without danger of over dissipation in the final amplifier stage.

Reference is made to FIG. 2 for details of the attenuator network 11 and the wattmeters 14 and 15.

The broadband voltage controlled attenuator is shown in the schematic of FIG. 2 as diodes 20 and 21 plus capacitor 22. The attenuator 11 operates as an L section attenuator with the series arm made up of the dynamic impedance of diodes 20 and 21 and the shunt arm being made up by the input impedance of the amplifier stage 12. The dynamic impedance of the diodes is controlled by the D.C. current passing through each and is a function of D.C. voltage applied to amplifier 18. Capacitor 22 reduces the distortion by making diode 20 conduct harder on the negative half of the input wave form and diode 21 conduct harder on the positive half of the input wave form.

Both wattmeters are coupled to output line 23 of the final amplifier 13. The forward wattmeter comprises a pickup coil 24 inductively coupled by magnetic toroid 25 to line 23 and shunted by parallel resistors 26 and 27. A sample of line current appears across these resistors. This wattmeter further comprises a voltage divider comprising capacitors 29 and 30, capacitor 30 being shunted by an adjustable capacitor 31. A sample of line voltage is developed at the junction of these capacitors. Diode rectifier 32 is connected between one junction of resistors 26 and 27 and the junction of capacitors 29 and 30, with its cathode connected to the lastmentioned junction. The voltage output of the rectifying diode 32 is applied through a resistor 33 to the output line 34. Between ground 35 and the other junction of resistors 26 and 27 is inserted a positive clamping diode 36.

Now referring to the reflected power meter, it comprises a current-sample pickup coil 37 (poled oppositely to 24) coupled to line 23 inductively by magnetic toroid 38, this winding being shunted by parallel resistors 39 and 40. A voltage sample is provided by a capacitive voltage divider comprising capacitors 41 and 42, the latter being shunted by adjustable capacitor 43. A rectifier diode 44 is connected between the junction of these capacitors and a junction of the resistors 39 and 40, and the remaining junction of these resistors is grounded as shown. Capacitor 43 is so adjusted that the output of the rectifier 44 is zero when, with power applied, the R.F. output of the system is terminated in its characteristic impedance. When there is no reflected power, the D.C. output of rectifier 44 is zero as delivered to its output circuit, which comprises series filter inductance 45 and shunt filter capacitance 46 and series filter resistor 47. The output of the forward wattmeter appears directly on line 34, and the output of the reflected power wattmeter is applied to line 34 via a series chain of diodes 48, 49 and 50 (located between resistor 47 and the cathode of diode 36), the diodes in this chain being poled alike (anode toward 47).

When the forward wattmeter is operating, the flow of electrons is via the circuit 34, 33, 32, 26–27, 36, and ground 35. When the reflected power wattmeter is working, the flow of electrons is via the circuit 34, 33, 32, 26–27, 50, 49, 48, 47, 45, 44, 39–40, and ground.

The circuitry is adjusted so that under the desired operating conditions, when there is no reflected power, and the forward power is at the proper level, the difference between a reference voltage applied to D.C. amplifier 18, functioning as a comparator, and the output of the forward wattmeter, as applied via line 34, to amplifier 18, causes to be developed on line 19 a control potential of such magnitude that the attenuator 11 permits the proper amount of power to pass through the amplifiers 12 and 13. In the event of an undesired increase in this level the output of wattmeter 14 increases and the voltage on line 19 becomes such as to increase the attenuation and restore the desired power level. Conversely, if the power level decreases the voltage at 34 decreases and the attenuation is caused to decrease. The presence of reflected power causes an output from wattmeter 15 at 47. The direct current circuit may be traced from resistor 47, through the anode and cathode of diode 48, the anode and cathode of diode 49, the anode and cathode of diode 50, the parallel combination of resistors 26 and 27, the anode and cathode of diode 32 and resistor 33. As a result, the output at 47 is added to the output of rectifier 32 and the summation appears at 34, the elements 47–50, 26–27, 32 and 33 service as an adder or signal combining network. The production of an output by the reflected power wattmeter renders conductor 51 more positive and thus causes diode 36 to become an open circuit, its cathode side being positive. That is to say, when the output of the reflected power meter is above zero, the switch provided by clamping diode 36 is shut off, and this diode effectively becomes an open circuit, its cathode side being positive. Side 52 of the reflected power wattmeter is grounded but a capacitor 28 is inserted between side 51 of the forward wattmeter and ground.

The diode types, in one illustrative embodiment of the invention, were as follows:

| Diode: | Type |
|---|---|
| 20 | 1N916 |
| 21 | 1N916 |
| 32 | 1N916 |
| 44 | 1N916 |
| 36 | 1N645 |
| 48 | 1N645 |
| 49 | 1N645 |
| 50 | 1N645 |

Directional wattmeters similar to the wattmeters 14 and 15 are described in detail in an article by Warren B. Bruene entitled "An Inside Picture of Directional Wattmeters" published in the April 1959 issue of QST magazine, and are otherwise per se well known to those skilled in the art.

While there has been shown and described what is at present considered to be the preferred embodiment of the invention, it will be understood by those skilled in the art that various changes and modifications may be made therein without departing from the scope of the invention as defined in the appended claims.

We claim:

1. In a system for regulating the flow of electrical power into a load, the combination of:
- a source;
- means coupled between the source and the load for regulating said flow;
- and means for controlling the regulating means, comprising:
  - means for furnishing a first signal representative of forward power being supplied to the load,
  - means for furnishing a second signal representative of reflected power from the load,
  - and means utilizing a combination of the first and second signals for deriving a control signal which is applied to the regulating means as a function of the forward power supplied to the load and as a function of a mismatch to the load indicated by the presence of reflected power.

2. The combination in accordance with claim 1 in which the source produces radio frequency power and in which the means coupled between the source and the load comprises an attenuator.

3. The combination in accordance with claim 2 in which at least one amplifier is interposed between the attenuator and the load.

4. The combination in accordance with claim 3 in which the means for producing the first and second signals are a forward power wattmeter and a reflected power wattmeter, respectively.

5. The combination in accordance with claim 4 in which the wattmeters derive samples from the output of the final amplifier.

6. The combination in accordance with claim 5 in which the means utilizing a reference and the combination of the first and second signals comprises a comparator.

7. The combination in accordance with claim 6 in which the means utilizing a reference and the combination of the first and second signals further comprises a summing network having an output coupled to said comparator and inputs individually coupled to said wattmeters.

8. In a system for regulating the flow of electrical power to a load, the combination of:
- a source producing radio frequency power;
- an attenuator coupled between the source and the load for regulating said flow;
- at least one amplifier interposed between the attenuator and the load;
- and means for controlling the attenuator, comprising:
  - a forward power wattmeter furnishing a first signal representative of forward power being supplied to the load, said wattmeter deriving said first signal from the output of the final amplifier,
  - and a reflected power wattmeter furnishing a second signal representative of reflected power from the load, said reflected power wattmeter deriving said second signal from the output of the final amplifier,
  - a comparator utilizing a reference and the combination of the first and second signals for deriving a control signal which is applied to the attenuator,
  - a summing network having an output coupled to said comparator and inputs individually coupled to said wattmeters,
  - said summing network including diodes having a given polarity so that the output of the reflected power wattmeter is added to the output of the forward watt power and the forward power wattmeter is effectively disconnected from ground as soon as the reflected power wattmeter produces an output, whereby the attenuator is controlled as a function of the forward power supply to the load and as a function of a mismatch to the load indicated by the presence of reflected power.

9. In a system for regulating the flow of electrical power to a load, the combination of:

a source producing electrical power;

means coupled between the source and the load for regulating said flow;

and means for controlling the regulating means, comprising:

means for furnishing a first signal representative of forward power being supplied to the load, means for furnishing a second signal representative of reflected power from the load, and means for utilizing a reference signal and a combination of said first and second signals for producing a control signal which is applied to the regulating means as a function of the first control signal for maintaining said forward power at a given level for matched conditions and reducing the power level during the presence of reflected power indicating a mismatch to the load.

References Cited

UNITED STATES PATENTS

| | | | |
|---|---|---|---|
| 2,798,207 | 6/1957 | Reggia | 333—17 X |
| 2,971,164 | 2/1961 | Saari | 330—145 |
| 2,993,181 | 7/1961 | Friedman et al. | 333—17 |
| 3,248,609 | 4/1966 | Gambale | 317—43 X |
| 3,249,871 | 5/1966 | Duncan | 325—159 X |
| 3,281,697 | 10/1966 | Hansen et al. | 325—151 |
| 3,020,529 | 2/1962 | Turner | 340—235 |
| 3,176,214 | 3/1965 | Johnson | 323—66 X |

ROBERT L. GRIFFIN, *Primary Examiner.*

JOHN W. CALDWELL, *Examiner.*

B. V. SAFOUREK, *Assistant Examiner.*